United States Patent
Wang et al.

(10) Patent No.: US 10,338,863 B1
(45) Date of Patent: Jul. 2, 2019

(54) METHOD AND SYSTEM FOR REUSE OF COLOR MEASUREMENT DATA FOR COLOR VERIFICATION OF A PRINTER, IMAGE FORMING APPARATUS, OR MULTI-FUNCTIONAL PERIPHERAL (MFP)

(71) Applicant: Konica Minolta Laboratory U.S.A., Inc., San Mateo, CA (US)

(72) Inventors: Eddie Wang, San Jose, CA (US); Kazuto Yamamoto, Foster City, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 20 days.

(21) Appl. No.: 15/858,057

(22) Filed: Dec. 29, 2017

(51) Int. Cl.
    G06F 3/12 (2006.01)
    H04N 1/60 (2006.01)

(52) U.S. Cl.
    CPC .......... *G06F 3/1219* (2013.01); *G06F 3/1259* (2013.01); *H04N 1/6041* (2013.01)

(58) Field of Classification Search
    CPC .... G06F 3/1219; G06F 3/1259; H04N 1/6041
    See application file for complete search history.

(56) References Cited

U.S. PATENT DOCUMENTS

| 7,420,705 | B2 | 9/2008 | Yamada et al. |
| 2003/0048464 | A1 | 3/2003 | Yamada et al. |
| 2008/0204773 | A1 | 8/2008 | Morgana et al. |

FOREIGN PATENT DOCUMENTS

EP   1 291 822 A2   3/2003

*Primary Examiner* — Christopher Wait
(74) *Attorney, Agent, or Firm* — Buchanan Ingersoll & Rooney PC

(57) ABSTRACT

An image forming apparatus, a method and a computer readable medium for color verification of an image forming apparatus are disclosed. The image forming apparatus includes a sensing device configured to read a color chart; and a processor configured to: perform a first color verification job; perform a second color verification job after the first color verification job when the first color verification job is interrupted, the second color verification job including one or more color patches from a previous color verification job; acquire measurement data from the previous color verification job; acquire measurement data from the second color verification job; and determine whether to re-use the measurement data of the previous color verification job based on one or more differences between the measurement data of the previous color verification job and the measurement data of the second color verification job.

20 Claims, 16 Drawing Sheets

|  | Target color | | |
|---|---|---|---|
|  | L* | a* | b* |
| Patch [1] | L*target(1) | a*target(1) | b*target(1) |
| Patch [2] | L*target(2) | a*target(2) | b*target(2) |
| Patch [3] | L*target(3) | a*target(3) | b*target(3) |
| Patch [4] | L*target(4) | a*target(4) | b*target(4) |
| Patch [5] | L*target(5) | a*target(5) | b*target(5) |
| Patch [6] | L*target(6) | a*target(6) | b*target(6) |
| Patch [7] | L*target(7) | a*target(7) | b*target(7) |
| Patch [8] | L*target(8) | a*target(8) | b*target(8) |
| Patch [9] | L*target(9) | a*target(9) | b*target(9) |
| Patch [10] | L*target(10) | a*target(10) | b*target(10) |
| Patch [11] | L*target(11) | a*target(11) | b*target(11) |
| Patch [12] | L*target(12) | a*target(12) | b*target(12) |
| Patch [13] | L*target(13) | a*target(13) | b*target(13) |
| Patch [14] | L*target(14) | a*target(14) | b*target(14) |
| Patch [15] | L*target(15) | a*target(15) | b*target(15) |
| Patch [16] | L*target(16) | a*target(16) | b*target(16) |
| Patch [17] | L*target(17) | a*target(17) | b*target(17) |
| Patch [18] | L*target(18) | a*target(18) | b*target(18) |
| Patch [19] | L*target(19) | a*target(19) | b*target(19) |
| Patch [20] | L*target(20) | a*target(20) | b*target(20) |
| Patch [21] | L*target(21) | a*target(21) | b*target(21) |
| Patch [22] | L*target(22) | a*target(22) | b*target(22) |
| Patch [23] | L*target(23) | a*target(23) | b*target(23) |
| Patch [24] | L*target(24) | a*target(24) | b*target(24) |
| Patch [25] | L*target(25) | a*target(25) | b*target(25) |
| Patch [26] | L*target(26) | a*target(26) | b*target(26) |
| . | . | . | . |
| . | . | . | . |
| . | . | . | . |

| | Measured data | | |
|---|---|---|---|
| | L* | a* | b* |
| Patch [1] | L*measured(1) | a*measured(1) | b*measured(1) |
| Patch [2] | L*measured(2) | a*measured(2) | b*measured(2) |
| Patch [3] | L*measured(3) | a*measured(3) | b*measured(3) |
| Patch [4] | L*measured(4) | a*measured(4) | b*measured(4) |
| Patch [5] | L*measured(5) | a*measured(5) | b*measured(5) |
| Patch [6] | L*measured(6) | a*measured(6) | b*measured(6) |
| Patch [7] | L*measured(7) | a*measured(7) | b*measured(7) |
| Patch [8] | L*measured(8) | a*measured(8) | b*measured(8) |
| Patch [9] | L*measured(9) | a*measured(9) | b*measured(9) |
| Patch [10] | L*measured(10) | a*measured(10) | b*measured(10) |
| Patch [11] | L*measured(11) | a*measured(11) | b*measured(11) |
| Patch [12] | L*measured(12) | a*measured(12) | b*measured(12) |
| Patch [13] | L*measured(13) | a*measured(13) | b*measured(13) |
| Patch [14] | L*measured(14) | a*measured(14) | b*measured(14) |
| Patch [15] | L*measured(15) | a*measured(15) | b*measured(15) |
| Patch [16] | L*measured(16) | a*measured(16) | b*measured(16) |
| Patch [17] | L*measured(17) | a*measured(17) | b*measured(17) |
| Patch [18] | L*measured(18) | a*measured(18) | b*measured(18) |
| Patch [19] | L*measured(19) | a*measured(19) | b*measured(19) |
| Patch [20] | L*measured(20) | a*measured(20) | b*measured(20) |
| Patch [21] | L*measured(21) | a*measured(21) | b*measured(21) |
| Patch [22] | L*measured(22) | a*measured(22) | b*measured(22) |
| Patch [23] | L*measured(23) | a*measured(23) | b*measured(23) |
| Patch [24] | L*measured(24) | a*measured(24) | b*measured(24) |
| Patch [25] | L*measured(25) | a*measured(25) | b*measured(25) |
| Patch [26] | L*measured(26) | a*measured(26) | b*measured(26) |
| . | . | . | . |
| . | . | . | . |
| . | . | . | . |

FIG. 8

Original Color Chart Patch Measurement — 1310

| Measurement | Patch 1 | Patch 2 | Patch 3 | Patch 4 | ... |
|---|---|---|---|---|---|
| C | 78% | 77% | 0% | 45% | |
| M | 32% | 49% | 7% | 69% | |
| Y | 79% | 30% | 60% | 21% | |
| K | 15% | 60% | 0% | 12% | |

Sample Color Chart Patch Measurement (Pass) — 1320

| Measurement | Patch 1 | Patch 2 | Patch 3 | Patch 4 | ... |
|---|---|---|---|---|---|
| C | 78% | 76% | 0% | 45% | |
| M | 32% | 49% | 7% | 68% | |
| Y | 76% | 29% | 61% | 21% | |
| K | 15% | 60% | 0% | 12% | |

Measurement within 5% from original is consider accetable, meaning the enigne condition no change after paper jam cleared.

Sample Color Chart Patch Measurement (Fail) — 1330

| Measurement | Patch 1 | Patch 2 | Patch 3 | Patch 4 | ... |
|---|---|---|---|---|---|
| C | 72% | 37% | 0% | 45% | |
| M | 34% | 49% | 7% | 79% | |
| Y | 76% | 30% | 60% | 21% | |
| K | 15% | 54% | 0% | 12% | |

Measurement over 5% from original is consider unaccetable, meaning the engine condition is changed after paper jam cleared.

FIG. 13

METHOD AND SYSTEM FOR REUSE OF COLOR MEASUREMENT DATA FOR COLOR VERIFICATION OF A PRINTER, IMAGE FORMING APPARATUS, OR MULTI-FUNCTIONAL PERIPHERAL (MFP)

FIELD OF THE INVENTION

The present disclosure generally relates to a method and system for reusing color measurement data, and more particularly, to a method and system for reusing color measurement data in color verification (or color validation) of color printers, multi-function peripherals (MFP) and/or image forming apparatuses, for example, after a paper jam occurs, which stops the color verification process.

BACKGROUND OF THE INVENTION

Maintaining consistent and uniform tones is a desired goal in image forming apparatus and devices. For example, it can be desirable for an image to appear the same no matter which rendering system renders the image and no matter how many times an image is rendered on a particular system. The image should exhibit, for example, the same lightness or hue each time it is rendered on a given system and no matter on which system it is rendered. For this reason, rendering engines, such as print engines in a printing system, are put through a color verification (or color validation process) in order to evaluate whether the print engines realize appropriate color reproducibility.

In the color verification process, a plurality of color measurement pages, each of the plurality of color measurement pages having a plurality of color patches, are printed and measured by a measuring device, for example, a color sensing device in the image forming apparatus, and then each color measured by the measuring device is compared with a corresponding target color.

If one of the measured colors does not match the corresponding target color, color corrections can then be made to the image forming apparatus during a color calibration process.

As for a high-end printer in which high color reproducibility is required, thousands of color patches can be printed in one color verification process, and the verification process can be repeated with a short interval.

In addition, in a print shop, for example, Kinko's®, the print shop would perform the color verification process on each of the color printers or MFPs, for example, first thing in the morning (for example, before the shop opens) to ensure the color accuracy of each of the color printers or MFPs. Usually, the print shop will print and measure a set of color charts from a printer or a MFP with an inline scanner and spectrophotometer. For example, a set of color charts can contain multiple pages of color chart, for example, 50 or more pages.

In some situations, the color printer or MFP may experience an interruption, for example, a paper jam, during or after the color verification process. After the paper jam is cleared, the verification process or procedure needs to be restarted, which results in the color printer or MFP having to re-print an entirety of the color charts from the beginning, for example, each and every page of the color chart, starting with page 1, since printer conditions can change after an interruption in the printing process. Especially, in a case of jam, color conditions are likely to change. For example, after the paper jam is cleared, the entire verification process has to be restarted when a paper jam occurs, no matter how many pages were printed before the jam occurred. The restarting of the verification process can result in lost time and use of additional materials. For example, during the printing of a set of color charts, for example, a 50 page color chart, and a paper jam occurs at page 49, then all pages printed before the jam occur are wasted, and the previously printed 49 pages need to be reprinted and measured again.

SUMMARY OF THE INVENTION

Accordingly, it would be desirable to avoid, for example, paper waste and use of toner and/or ink in a color verification process by having a method and system which determines if color measurement data obtained prior to the interruption or paper jam can be re-used after a paper jam occurs during color verification of a printer or MFP.

An image forming apparatus is disclosed, comprising: a sensing device configured to read a color chart, the color chart having one or more color patches; and a processor configured to: perform a first color verification job; perform a second color verification job after the first color verification job when the first color verification job is interrupted or when a print job is interrupted before a completion of the first color verification job, the second color verification job including one or more color patches from a previous color verification job; acquire measurement data from the previous color verification job; acquire measurement data from the second color verification job; and determine whether to re-use the measurement data of the previous color verification job based on one or more differences between the measurement data of the previous color verification job and the measurement data of the second color verification job.

A method is disclosed for color verification of an image forming apparatus, the method comprising: acquiring measurement data of a previous color verification job; judging whether a first color verification job or a print job is interrupted; acquiring measurement data of a second color verification job when the first color verification job or the print job is interrupted; and determining whether to re-use the measurement data of the previous color verification job based on one or more differences between the measurement data of the previous color verification job and the measurement data of the second color verification job.

A non-transitory computer readable recording medium stored with a computer readable program code for color verification of an image forming apparatus, the computer readable program code configured to execute a process comprising: acquiring measurement data of a previous color verification job; judging whether a first color verification job or a print job is interrupted; acquiring measurement data of a second color verification job when the first color verification job or the print job is interrupted; and determining whether to re-use the measurement data of the previous color verification job based on one or more differences between the measurement data of the previous color verification job and the measurement data of the second color verification job.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7 is an illustration of a chart showing target color data in accordance with an exemplary embodiment.

FIG. 8 is an illustration of a chart showing actual color data in accordance with an exemplary embodiment.

FIG. 13 is an illustration of an example of a measurements obtained from exemplary color charts illustrating an original color patch measurement, an exemplary color patch measurement that is within a predetermined tolerance level or percentage, and an exemplary color patch measurement that is not within a predetermined tolerance level or percentage.

DETAILED DESCRIPTION

Figure 1:
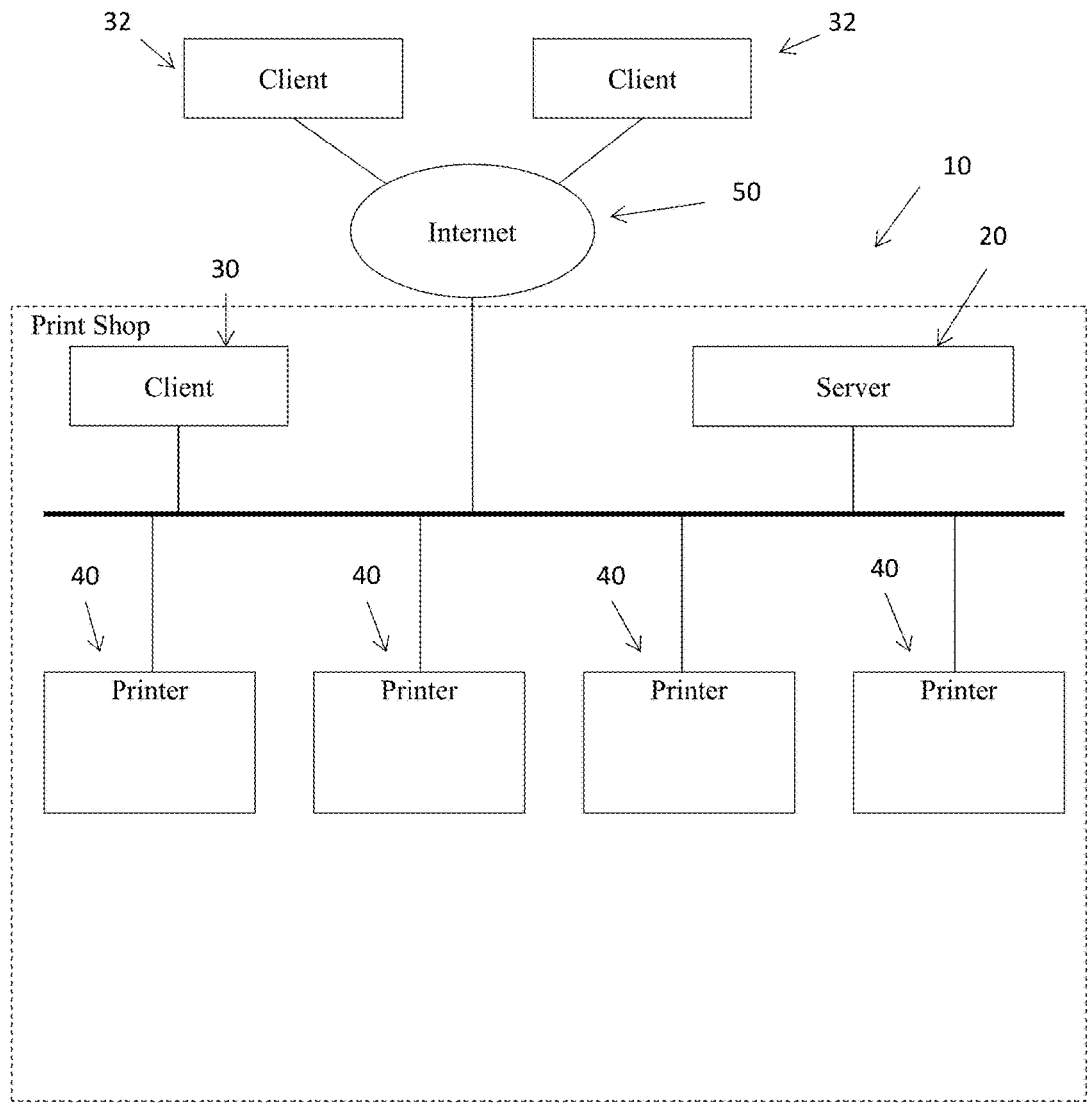
FIG. 1 is an illustration of an exemplary group or plurality of printing devices in a print shop in which a method or process for reusing color measurement data can be implemented in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Figure 4:
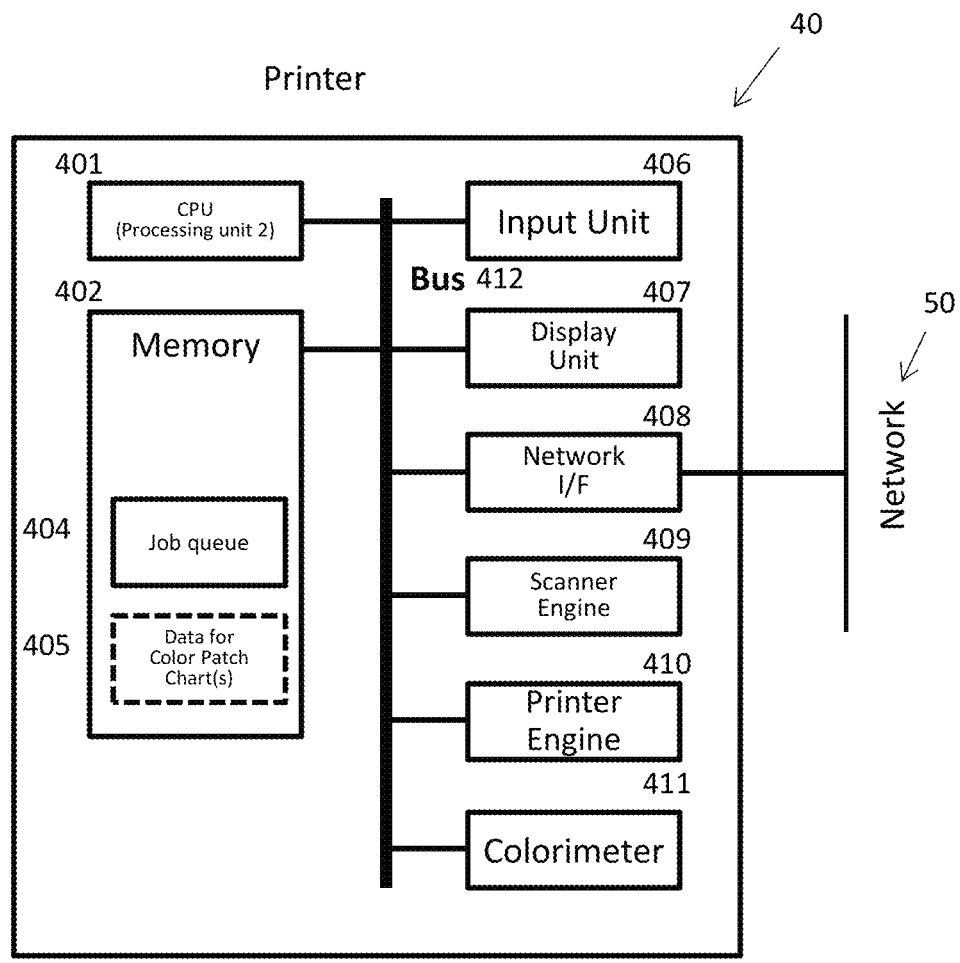
FIG. 4 is an illustration of a printer or printing device in accordance with an exemplary embodiment.

FIG. 1 is an illustration of an exemplary group or plurality of printing devices 40 in a print shop 10 in which a method or process for reusing color measurement data can be implemented in accordance with an exemplary embodiment. As shown in FIG. 1, the print shop 10 can include at least one at least one server 20, at least one client or client computer 30, and a plurality of image forming apparatuses, for example, printers or printing devices (or MFPs) 40. In accordance with an exemplary embodiment, the one or more printers or printing devices 40 can be connected, for example by a communication network (or network) 50 to one or more client devices 32 located outside of the print shop 10. In accordance with an exemplary embodiment, each of the one more printers or printing devices (or MFPs) 40 has a spectrophotometer (or colorimeter) 411 (FIG. 4).

In accordance with an exemplary embodiment, the communication network or network 50 can be a public telecommunication line and/or a network (for example, LAN or WAN). Examples of the communication network 50 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

Figure 2:
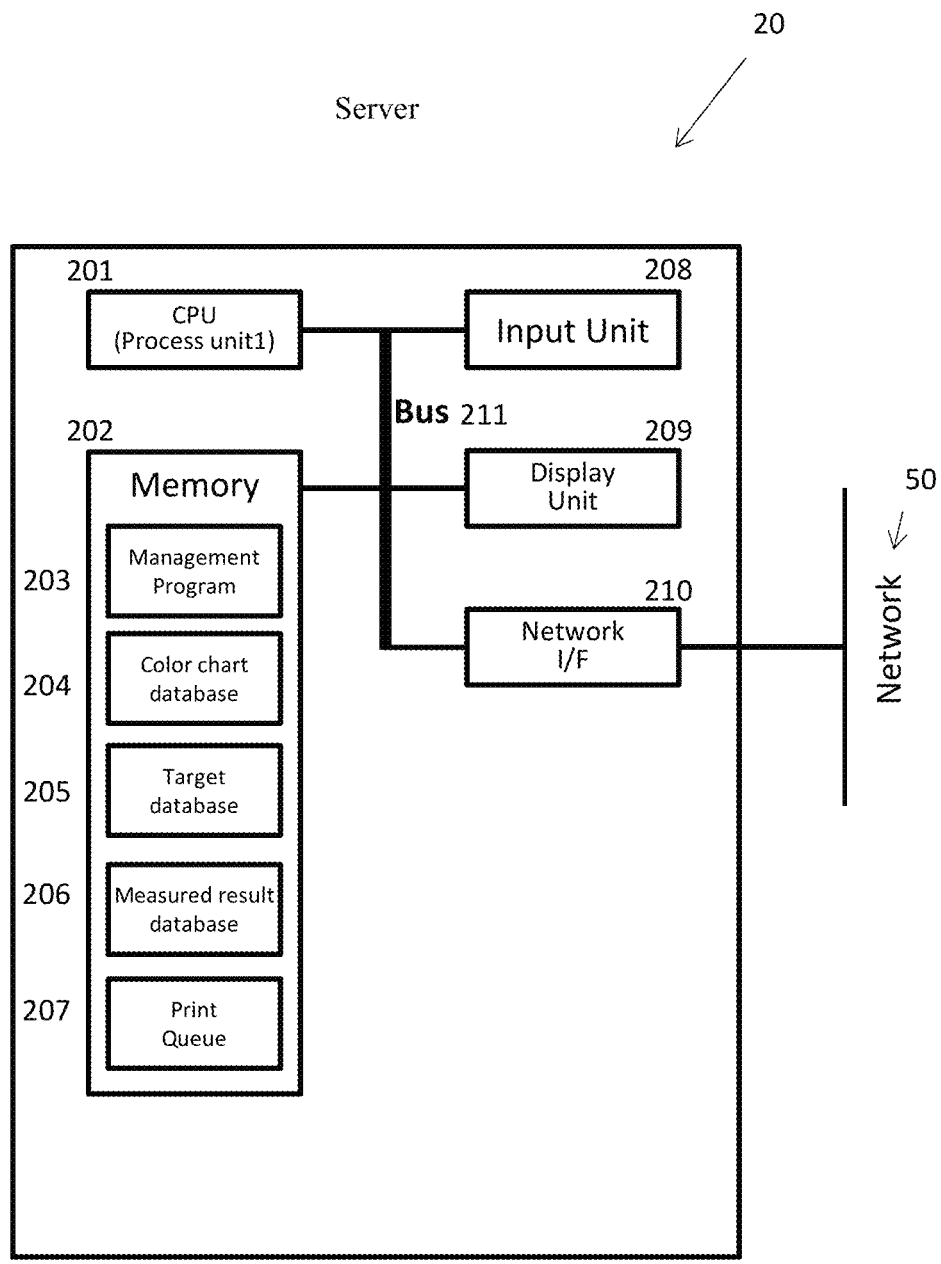
FIG. 2 is an illustration of a server in accordance with an exemplary embodiment.

FIG. 2 is an illustration of a server 20 in accordance with an exemplary embodiment. As shown in FIG. 2, the server 20 can include a processor or central processing unit (CPU) 201, and one or more memories 202 for storing software programs and data, which can include a management program (or web portal) 203, a color chart database 204, a target database 205, a measured result data base 206, and a print queue 207. The processor or CPU 201 carries out the instructions of a computer program, which operates and/or controls at least a portion of the functionality of the server 20. The server 20 can also include an input unit 208, a display unit or graphical user interface (GUI) 209, and a network interface (I/F) 210, which is connected to a communication network (or network) 50. A bus 211 can connect the various components 201, 202, 208, 209, and 210 within server 20. The server 20 includes an operating system (OS), which manages the computer hardware and provides common services for efficient execution of various software programs as disclosed herein.

Figure 3:
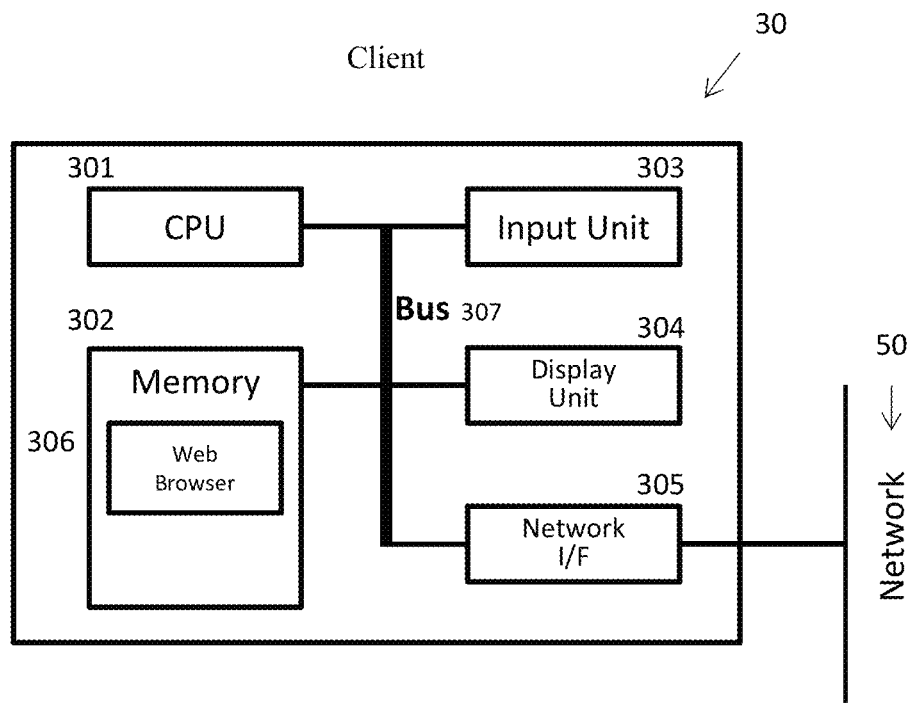
FIG. 3 is an illustration of a host computer or client computer in accordance with an exemplary embodiment.

FIG. 3 is an illustration of an exemplary host computer or client computer 30, 32 in accordance with an exemplary embodiment. As shown in FIG. 3, the exemplary host computer or client computer 30, 32 can include a processor or central processing unit (CPU) 301, and one or more memories 302 for storing software programs and data (such as files to be printed), and a printer driver. The printer driver of the client computer 30, 32 is preferably a software application that converts data to be printed into a form specific for the printer 40. The processor or CPU 301 carries out the instructions of a computer program, which operates and/or controls at least a portion of the functionality of the client computer 30, 32. The client computer 30, 32 can also include an input unit 303, a display unit or graphical user interface (GUI) 304, and a network interface (I/F) 305, which is connected to a communication network (or network) 50. A bus 307 can connect the various components 301, 302, 303, 304, 305, 306, within the client computer 30, 32.

In accordance with an exemplary embodiment, the one or more client computers 30 each include a display unit or graphical user interface (GUI) 304, which can access the web browser 306 in the memory 302 of the client computer 30. The web browser 306 is configured to provides access to the web portal (or management program) 203 designed to specifically bring together a customer looking to have a print shop to print a specific job, whether it's a book, a stapled document, instruction manuals, flyers, labels, etc. The web portal (or management program) 203 is preferably hosted on the at least one server 20. However, the web portal (or management program) 203 can be hosted on at least one client computer 30 and/or on one or more printers 40 within a print shop 14.

The client computer 30 includes an operating system (OS), which manages the computer hardware and provides common services for efficient execution of various software programs. The software programs can include, for example, application software and printer driver software. For example, the printer driver software controls a multifunction printer or printer 40, for example connected with the client computer 30 in which the printer driver software is installed via the communication network 50. In certain embodiments, the printer driver software can produce a print job and/or document based on an image and/or document data. In addition, the printer driver software can control transmission of the print job from the client computer 30 to the at least one server 20 and/or the printer or printing device 40.

FIG. 4 is an illustration of a printer or printing device 40, which can be referred to as an image forming apparatus in accordance with an exemplary embodiment. As shown in FIG. 4, the printer 40 can include a network interface (I/F) 408, which is connected to the communication network (or network) 50, a processor or central processing unit (CPU) 401, and one or more memories 402 for storing software programs and data (such as files to be printed). For example, the software programs can include a printer controller and a tray table. The processor or CPU 401 carries out the instructions of a computer program, which operates and/or controls at least a portion of the functionality of the printer 40. In accordance with an exemplary embodiment, the one or more memories 402 can include a job queue 404 and data for color patch chart(s) 405. The printer 40 can also include an input unit 406, a display unit or graphical user interface (GUI) 407, a network interface (I/F) 408, a scanner engine (or scanner) 409, a printer engine 410, and a colorimeter 411. In accordance with an exemplary embodiment, the printer 40 can be equipped with inline colorimeter (ICCU) (or spectrophotometer) 411, which measures printed color patches in order to generate color profiles.

In accordance with an exemplary embodiment, for example, the colorimeter (or spectrophotometer) 411 can be one or more color sensors or colorimeters, such as an RGB (Red Green Blue) scanner, a spectral scanner with a photo detector or other such sensing device known in the art, which can be embedded in the printed paper path, and an optional finishing apparatus or device (not shown). A bus 412 can connect the various components 401, 402, 404, 405, 406, 407, 408, 409, 410, 411 within the printer 40. The printer 40 also includes an operating system (OS), which manages the computer hardware and provides common services for efficient execution of various software programs. In accordance with an exemplary embodiment, it can be within the scope of the disclosure for the printer 40 to be a copier.

For example, in accordance with an exemplary embodiment, an image processing section within the printer 40 can carry out various image processing under the control of a print controller or CPU 401, and sends the processed print image data to the print engine 410. The image processing section can also include a scanner section (scanner 409) for optically reading a document, such as an image recognition system. The scanner section receives the image from the scanner 409 and converts the image into a digital image. The print engine 410 forms an image on a print media (or recording sheet) based on the image data sent from the image processing section. The central processing unit (CPU) (or processor) 401 and the memory 402 can include a program for RIP processing (Raster Image Processing), which is a process for converting print data included in a print job into Raster Image data to be used in the printer or print engine 410. The CPU 401 can include a printer controller configured to process the data and job information received from the one or more client computers 30, 32, for example, received via the network connection unit and/or input/output section (I/O section) 408.

The CPU 401 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client computers 30, 32 to generate a print image.

In accordance with an exemplary embodiment, the network I/F 408 performs data transfer with the at least one server 20 and the at least one client computer 30, 32. The printer controller can be programmed to process data and control various other components of the multi-function peripheral to carry out the various methods described herein. In accordance with an exemplary embodiment, the operation of printer section commences when the printer section receives a page description from the at least one server 20 or the one or more client computers 30, 32, via the network I/F 408 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 40 consistent with exemplary embodiments of the disclosure include, but are not limited to, a multi-function peripheral (MFP), a laser beam printer (LBP), an LED printer, a multi-function laser beam printer including copy function.

Figure 5:
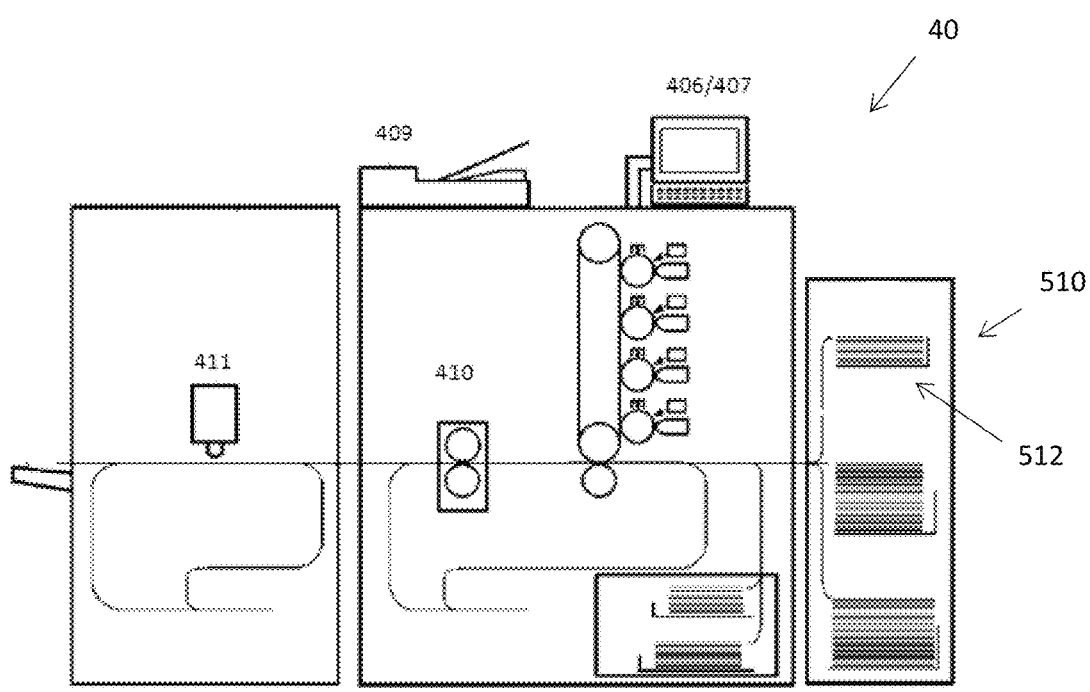
FIG. 5 is an illustration of an exterior of the printer or printing device as shown in FIG. 4.

FIG. 5 is an illustration of an exterior of the printer or printing device 40 as shown in FIG. 4. As shown in FIG. 5, the printer 40 can also include at least one auto tray or paper tray 510, and more preferably a plurality of auto trays or paper trays 510. Each auto tray or paper tray 510 can include a bin or tray, which holds a stack of a print media 512, for example, a paper or a paper-like product. The printer engine or print engine 410 has access to a print media 512 of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

In accordance with an exemplary embodiment, the color verification (and corresponding color calibration, if needed) of the at least one printer or MFP 40 as shown in FIGS. 4 and 5, can be performed by creating a color test pattern, for example, on the print controller of the CPU 401, which can be, for example, a Digital Front End (DFE) printer controller that can be set based on one or more print conditions or manually configured, for example, after a specific number of print copies have been printed by the printing device or printer 40, or alternatively, can be manually configured such that upon opening of the print shop 10, each of the one or more printers 40 can execute a color verification process as disclosed herein. With the calibration setting enabled, the color charts (or color measurement pages) can be printed, and the one or more printed color charts and corresponding color patches on each of the one or more printed color charts can be compared to a corresponding target color for each of the one or more printed color patches using the colorimeter 411. The color calibration patch compared to the target color (or target color data) can determine the color rendering performance of print engine of the printing device or printer 40 and/or generating a color profile as disclosed herein. In accordance with an exemplary embodiment, color profiles can include color gamut or color spaces and monochromatic or spectral colors.

In accordance with an exemplary embodiment, the print media 512 is preferably a paper or paper-like media having one or more print media attributes. The print media attributes can include, for example, paper color, coating, grain direction, printing technology, brightness, CIE, tint, whiteness, labColor, etc. In order to maximize print quality, the print media attributes of each type of print media should be input into or hosted on the printer 40, for example, on printer configuration settings of the printer 40 to obtain the highest quality output. Most print media 512 is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

Figure 6:
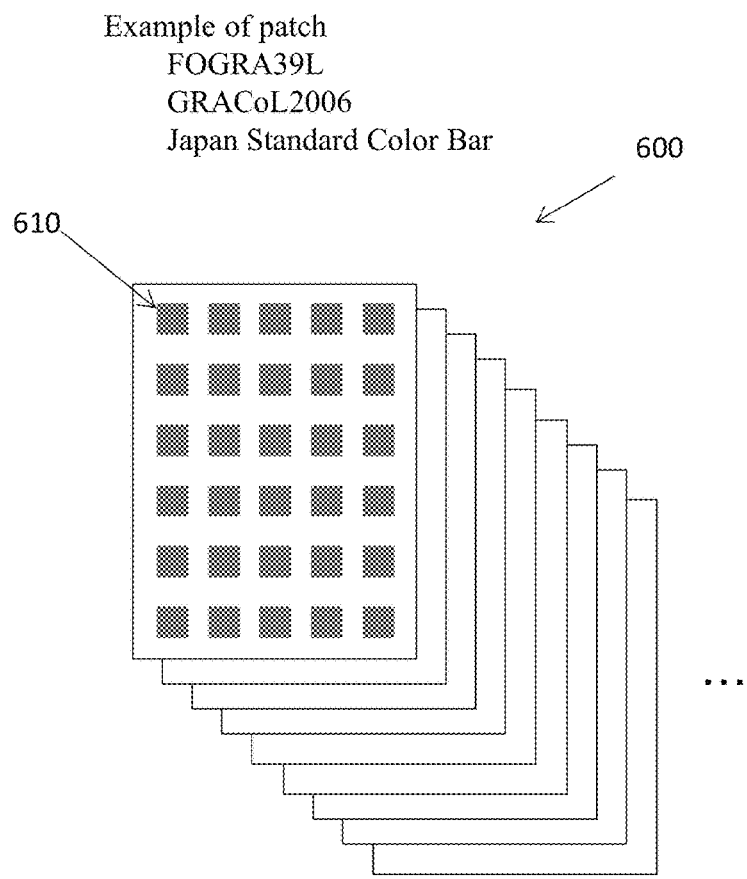
FIG. 6 is an illustration of an exemplary color patch chart, which can be printed by the printer or printing device as shown in FIGS. 4 and 5.

FIG. 6 is an illustration of an exemplary color patch chart 600, which can be printed by the printer or printing device 40 as shown in FIGS. 4 and 5. As shown in FIG. 6, the printed color patch chart 600 can include a plurality of color patches (or validation print stripes) 610 printed on one or more sheets of a print media 512. As disclosed herein, the plurality of color patches are preferably read by the in-line spectrophotometer or colorimeter 411. The in-line spectrophotometer or colorimeter 411, for example, can be one or more inline color sensors (not shown), which are located in the paper path, and which feeds information to the CPU 401 for processing. The information received by the CPU (or processor) 401 from the in-line spectrophotometer or colorimeter 411 can be used to determine if one or more of the color patches 610 has failed, for example, at least one of the printed color patches 610 as read by the inline spectrophotometer or colorimeter 411 does not match a target color and/or the color quality is not within a desired target color data (or range).

In accordance with an exemplary embodiment, the color verification (or color validation) is a function to compare the colors between a target color and an actual color measured by a measuring device, for example, a color sensing device in the printer (or MFP) 40. In the color verification, a plurality of color measurement pages, each of the plurality of color measurement pages having a plurality of color patches, are printed and measured by a measuring device. If the measured color does not match the target color, color corrections can then be made to the printer or printing device 40.

In accordance with an exemplary embodiment, the target color can include, for example, a color gamut or gradient, based on the CMYK color model or the RGB color models, which can include, for example, FOGRA, FOGRA27, FOGRA39, ISO12647-7 Control Wedge 2013+GRACOL 2006, ISO coated v2 (ECI), ISO coated v2 300% (ECI), Coated GRACol 2006, Web Coated SWOP 2006 Grade 3 Paper, Web Coated SWOP 2006 Grade 5 Paper, Adobe RGB saturation, Adobe RGB perceptual, Adobe Wide-gamut RGB color space, etc. In accordance with an exemplary embodiment, for each of the target colors, color gamut, and/or color gradients, a profile table is preferably hosted on the client computer 30. However, the profile table can also be hosted on the server 20 and/or the printer 40.

FIG. 7 is an illustration of a chart 700 showing target color data in accordance with an exemplary embodiment. As shown in FIG. 7, the target color data 700 can be expressed by a listing of each of the patches (n number of patches) and a corresponding color target. In accordance with an exemplary embodiment, the corresponding color target can be expressed in terms of L*target(n), a*target(n), b*target(n) for each of n number of patches, or alternatively, as C %, M %, Y %, and K % as shown, for example, in FIG. 13.

FIG. 8 is an illustration of a chart showing actual color data 800 in accordance with an exemplary embodiment. As shown in FIG. 8, the measured color data 800 can be expressed by a listing of each of the patches (n number of patches) and corresponding measured data. In accordance with an exemplary embodiment, the corresponding measured data can be expressed in terms of L*measured(n), a*measured(n), b*measured(n) for each of n number of patches.

Figure 9:
FIG. 9 is an illustration of a chart showing color quality in accordance with an exemplary embodiment.

FIG. 9 is an illustration of a chart 900 showing color quality in accordance with an exemplary embodiment. As shown in FIG. 9, the color quality of a printer 40, for example, can be calculated using the following formula:

$$\Delta E_n = \sqrt{((L*_{ntarget} - L*_{measured})^2 + (a*_{target} - a*_{measured})^2 + (b*_{target} - b*_{measured})^2)}$$

$$\text{Color quality } (\Delta E) = \frac{\left(\sum_{n=0}^{m} \Delta E_n\right)}{m}$$

Figure 10:
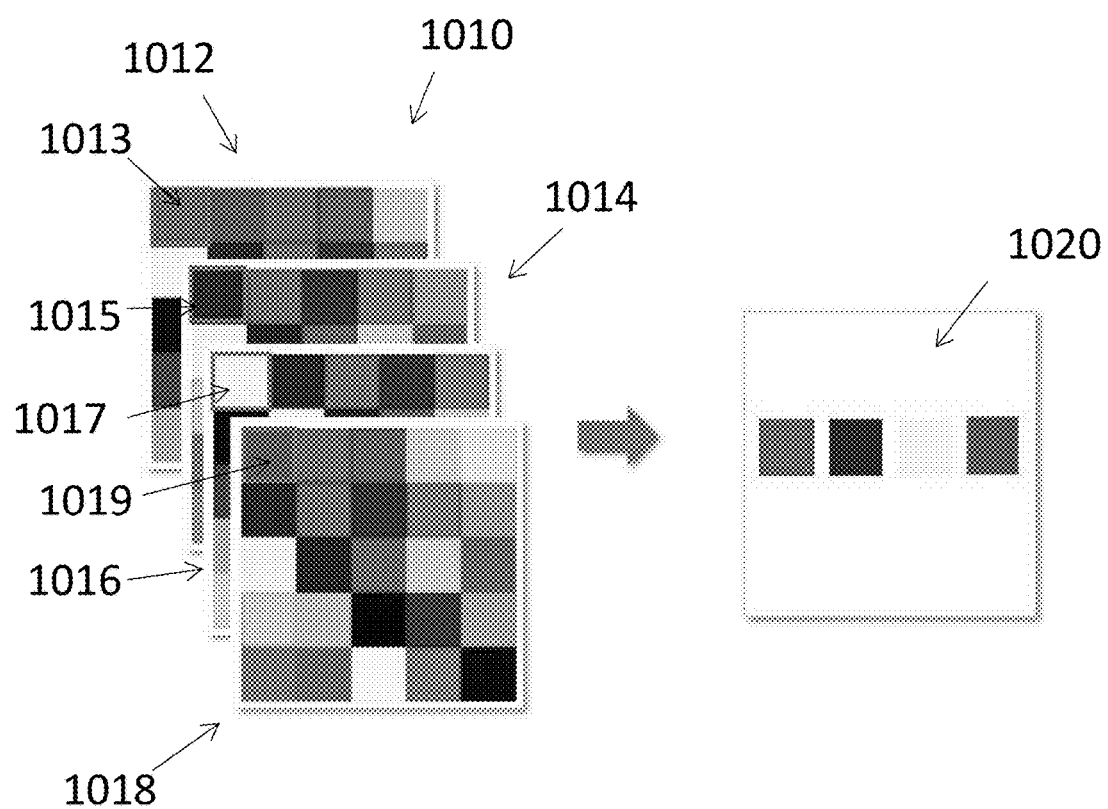
FIG. 10 is an illustration of a plurality of color patch charts, and an exemplary color chart that can be used to check printer conditions of a printer or printing device in accordance with an exemplary embodiment.

FIG. 10 is an illustration of a plurality of color patch charts 1010 and an exemplary color chart 1020 that can be used to check printer conditions of a printer or printing device 40 in accordance with an exemplary embodiment. As shown in FIG. 10, each of the plurality of color patch charts 1012, 1014, 1016, 1018 can include a plurality of color patches 1013, 1015, 1017, 1019, which can be arranged, for example, in columns and rows.

In accordance with an exemplary embodiment, the exemplary color chart 1020 can include one or more color patches from each of the plurality of color patch charts 1012, 1014, 1016, 1018. For example, as shown in FIG. 10, the selected color patches 1013, 1015, 1017, 1019, can be color patches from a corresponding row or column from each of the plurality of color patch charts. Alternatively, the selected color patches 1013, 1015, 1017, 1019, can be a color patch selected from various sections or portion of the plurality of color patch charts 1012, 1014, 1016, 1018, based on a desired color gamut, which each of the various color (or color spaces) is represented in the selected color patches 1013, 1015, 1017, 1019, or randomly selected from each of the plurality of color patch charts 1012, 1014, 1016, 1018.

Figure 11:
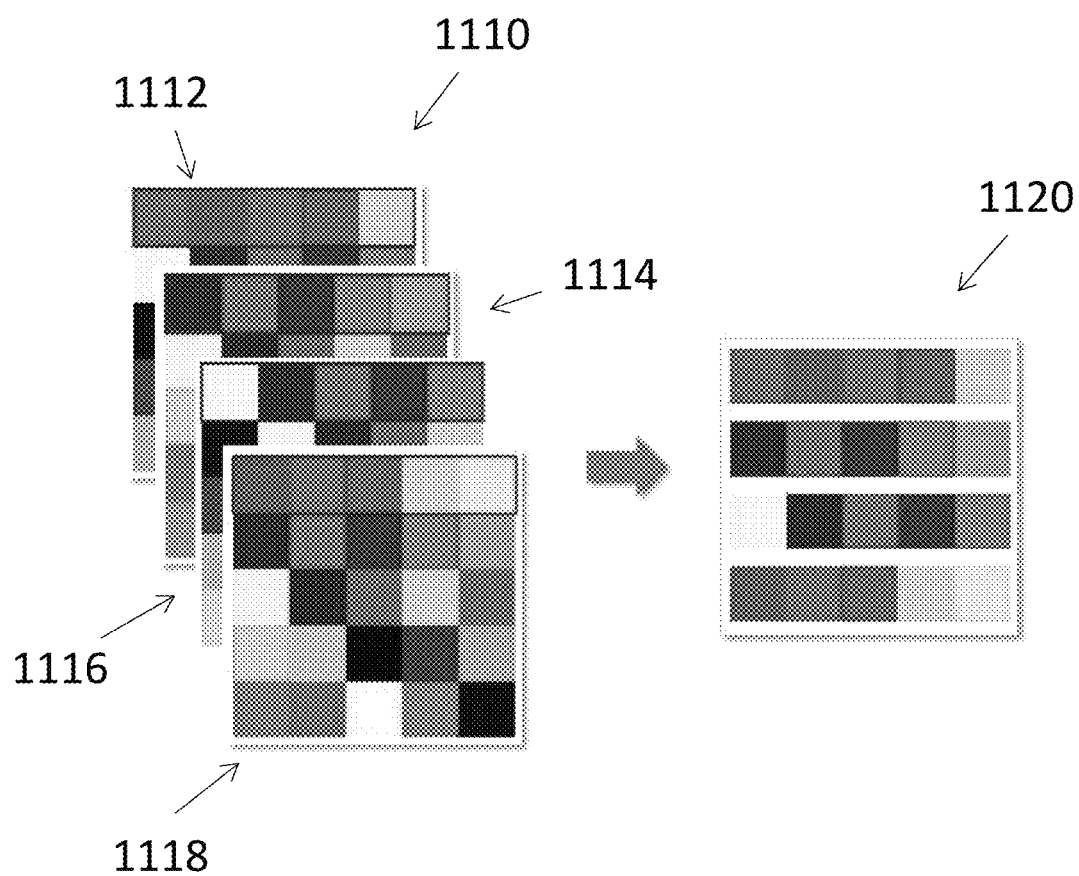
FIG. 11 is another illustration of plurality of color patch charts, and an exemplary color chart that can be used to check printer conditions of a printer or printing device in accordance with an exemplary embodiment.

FIG. 11 is an illustration of plurality of color patch charts 1110 and an exemplary color chart 1120 that can be used to check printer conditions of a printer or printing device 40 in accordance with an exemplary embodiment. As shown in FIG. 11, each of the plurality of color patch charts 1112, 1114, 1116, 1118 can include a plurality of color patches, which can be arranged in columns and rows. In accordance with an exemplary embodiment, the exemplary color chart 1120 can include one or more color patches from each of the plurality of color patches 1112, 1114, 1116, 1118, for example, a row of color patches can be selected from each of the plurality of color patch charts 1112, 1114, 1116, 1118.

In accordance with an exemplary embodiment, it would be preferable to select one or more color patches from each color patch chart (page) before interruption occur.

Figure 12:
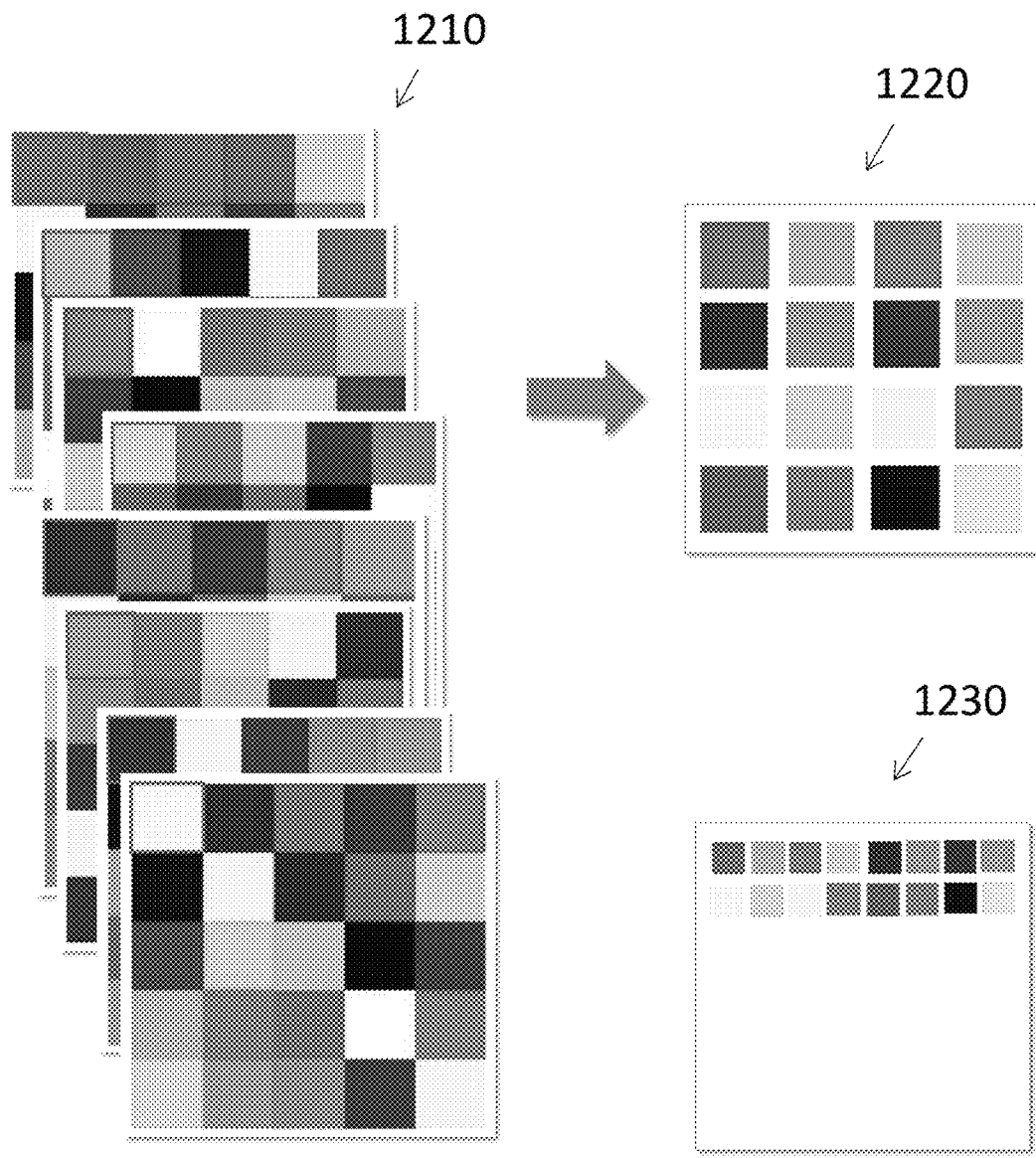
FIG. 12 is an illustration of a plurality of color patch charts, and exemplary color charts that can be used to check printer conditions of a printer or printing device in accordance with an exemplary embodiment.

FIG. 12 is an illustration of a plurality of color patch charts 1210, and exemplary color chart1 1220, 1230 that can be used to check printer conditions of a printer or printing device 40 in accordance with an exemplary embodiment. As shown in FIG. 12, each of the plurality of color patch charts 1210 can include a plurality of color patches, which can be arranged in columns and rows. In accordance with an exemplary embodiment, the exemplary color charts 1220, 1230 can include one or more color patches from each of the plurality of color patch charts 1210, which can be arranged on an entirety of the exemplary color chart 1220 or a portion of the exemplary color chart 1230.

FIG. 13 is an illustration of an example of a measurements obtained from exemplary color charts illustrating an original color patch measurement 1310, an exemplary color patch measurement that is within a predetermined tolerance level or percentage 1320, and an exemplary color patch measurement that is not within a predetermined tolerance level or percentage 1330.

For example, as shown in FIG. 13, the original color chart patch measurements 1310 can include a measurement value for C, M, Y, K, (cyan, magenta, yellow, and black) for example, in percentage (%), for one or more patches, for example, Patch 1, Patch 2, Patch 3, Patch 4, . . . , Patch N. In accordance with an exemplary embodiment, the sample color chart patch measurement (Pass) 1320 can include the measurement values for C, M, Y, K, (%), and if the measurement values are within a predetermined tolerance level, for example, 5% from the original value, the color chart patch measurements can be considered to be acceptable. In accordance with an exemplary embodiment, a determination can made, that the engine condition has not changed following the interruption in the verification process, for example, after the paper jam has been cleared.

In accordance with another exemplary embodiment, the sample color chart patch measurement (Fail) 1330 can include the measurement values for C, M, Y, K, (%), and if the measurement values are not within a predetermined tolerance level, for example, 5% from the original value, the color chart patch measurements can be considered to be unacceptable. In accordance with an exemplary embodiment, a determination can be made that the condition of the print engine has changed, for example, after the paper jam has been cleared, such that and that the color verification process should be restarted, for example, beginning with page 1 of the plurality of color patch charts 1010, 1110, 1210, and measured again. In addition, if the results indicate that the condition of the print engine is below a predetermined tolerance level, for example, the condition of the print engine is in a state of failure, the corresponding measurement data can be used during the color calibration of the print engine.

Figure 14:
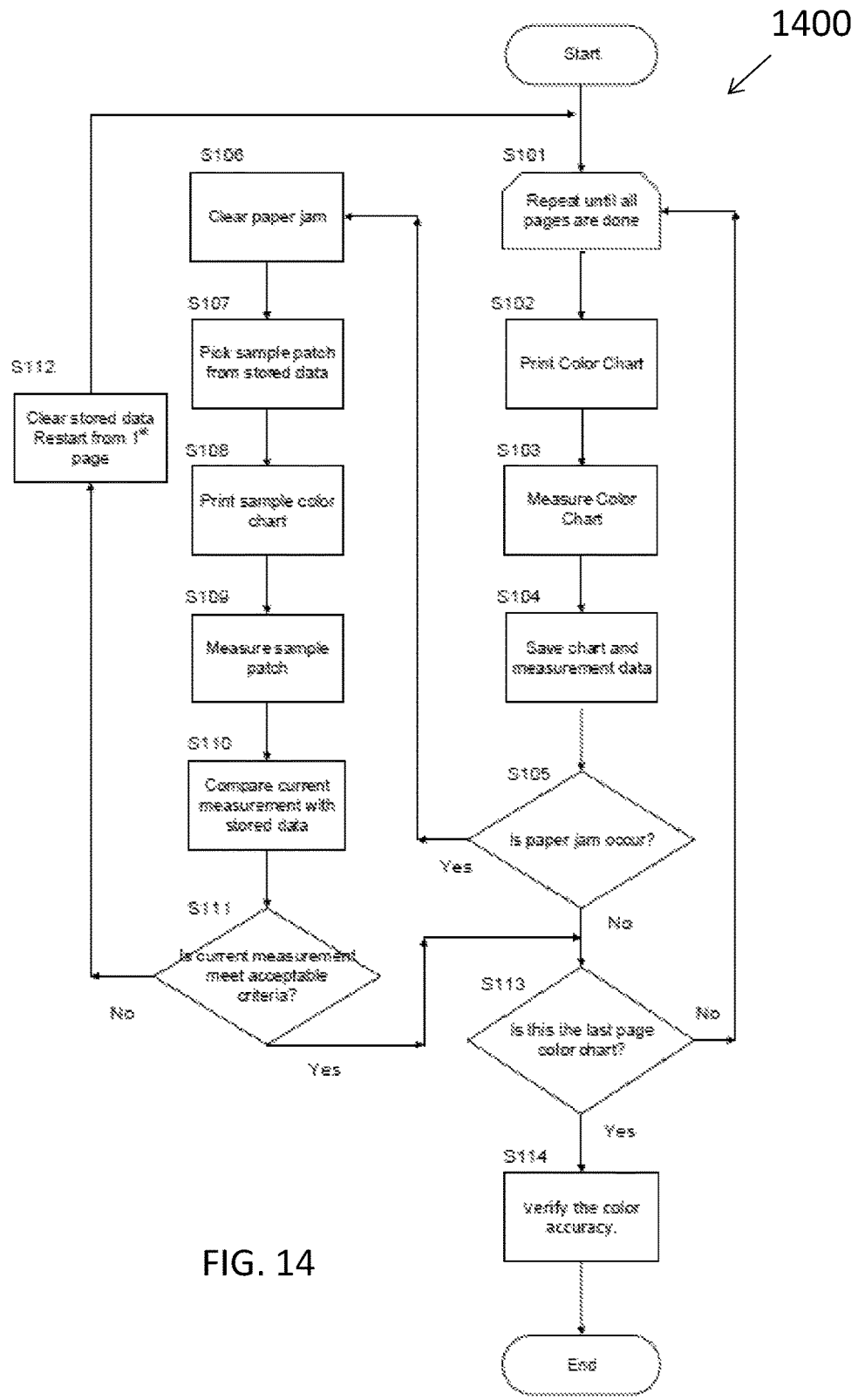
FIG. 14 is a flow chart illustrating a method and system for reusing color measurement data in accordance with an exemplary embodiment.

FIG. 14 is a flow chart 1400 illustrating a method and system for reusing color measurement data in accordance with an exemplary embodiment. As shown in FIG. 14, in step S101, the printer (or MFP) 40 is configured to print multiple color charts or a plurality of color charts 600, 1010, 1110, 1210 as shown, for example, in FIGS. 6, 10, 11, and 12. In step S102, the printer (or MFP) 40 prints a color chart (for example, a printed color page) of the plurality of color charts 600, 1010, 1110, 1210. In step S103, the printed color chart (or page) from step S103 is scanned on the printer (or MFP) 40 with a colorimeter (or spectrophotometer) 411, such as an RGB scanner, a spectral scanner with a photo detector or other such sensing device known in the art, which can be embedded in the printed paper path and/or an optional finishing apparatus, which measures the printed color chart. In step S104, the measurement data and corresponding identifier for the printed color chart 1010, 1110, 1210 is saved, for example, as a previous color verification job or past color verification job, for example, in the memory of the printer (or MFP) 40, or alternatively, in the memory of the server 20.

In accordance with an exemplary embodiment, in step S105, if a paper jam occurs, for example, during the printing of one or more of the plurality of printed color charts 600, 1010, 1110, 1210, in step S102, or the measurement of one or more of the plurality of the printed color charts, 600, 1010, 1110, 1210, the process continues to step S106, where the paper jam is cleared. In step S107, one or more sample patches, for example, patches 1013, 1015, 1017, 1019, can be selected from the saved measurement data and corresponding identifier for each of the selected color charts from step S104. In step S108, a sample color chart 1020, 1120, 1220, 1230, is printed. In step S109, the printed sample color chart (or page) 1020, 1120, 1220, 1230 from step S108 is scanned on the printer (or MFP) 40 with a colorimeter (or spectrophotometer) 411, such as an RGB scanner, a spectral scanner with a photo detector or other such sensing device known in the art, which can be embedded in the printed paper path and/or an optional finishing apparatus, which measures the printed color chart.

In accordance with an exemplary embodiment, in step S110, the measured data from step S109 is compared to the saved measurement data and corresponding identifier for the printed color chart 1010, 1110, 1210 from step S104. In accordance with an exemplary embodiment, the saved measurement data from step S104 can be from a previous (or past) verification job, for example, a current color verification job (i.e., a first color verification job as executed in steps S101-S104), which was being performed when the paper jam or interruption occurred, or alternatively, for example, from a color verification completion data, which was a previous (or past) color verification job, which was implemented or performed, for example, on a same day with the current verification job (or first color verification job). For example, the color verification completion job can be a color verification job performed upon starting of the printer (or MFP) 40.

In step S111, a determination is made if the current measured data from the sample color chart 1020, 1120, 1220, 1230 meets a predetermined or acceptable criteria, for example, is the measured data in step S109 within a given tolerance (or %), for example, as shown in FIG. 13.

In accordance with an exemplary embodiment, if the current measured data from the sample chart 1020, 1120, 1220, 1230 meets the predetermined or the acceptable criteria, for example, is the measured data in step S109 within a given tolerance (or %), for example, as shown in chart 1320 of FIG. 13, the process continues to step S113. If the current measured data from the sample chart 1020, 1120, 1220, 1230 does not meet the predetermined or acceptable criteria, for example, the measured data in step S109 is not within a given tolerance (or %), for example, as shown in chart 1330 of FIG. 13, the process continues to step S112, where the measured data from steps S103 and/or S109 are cleared and/or deleted, and the process returns to step S101, where the color verification process begins with the printing of a first page of the multiple color charts or the plurality of color charts.

Alternatively, in step S105, if no paper jam has occurred, for example, during the printing of the printed color charts in step S102, or the measurement of the printed color chart, the process continues to step S113, where a determination is made if the printed color chart is a last page of the color chart. If in step S113, the printed color chart is not the last page of the multiple color charts or the plurality of color charts, the process continues to step S101, where the next page in the multiple color charts or the plurality of color charts is printed. If the last page of the multiple color charts or the plurality of color charts has been printed, the process continues to step S114, where the printer (or MFP) 40 verifies the color accuracy of the printed color charts through the color verification process as disclosed herein.

In accordance with an exemplary embodiment, if the printed color matches are within a predefined measurement range, percentage (%), or tolerance level, the color verification process can be confirmed to be within a desired performance parameter. Alternatively, if the color verification process shows that the condition of the print engine is not within a desired performance parameter, the printer (or MFP) 40 will conduct a color calibration of the print engine to bring the print engine within a desired performance level capable of reproducing the color gamut or color spaces as needed.

Figure 15A:
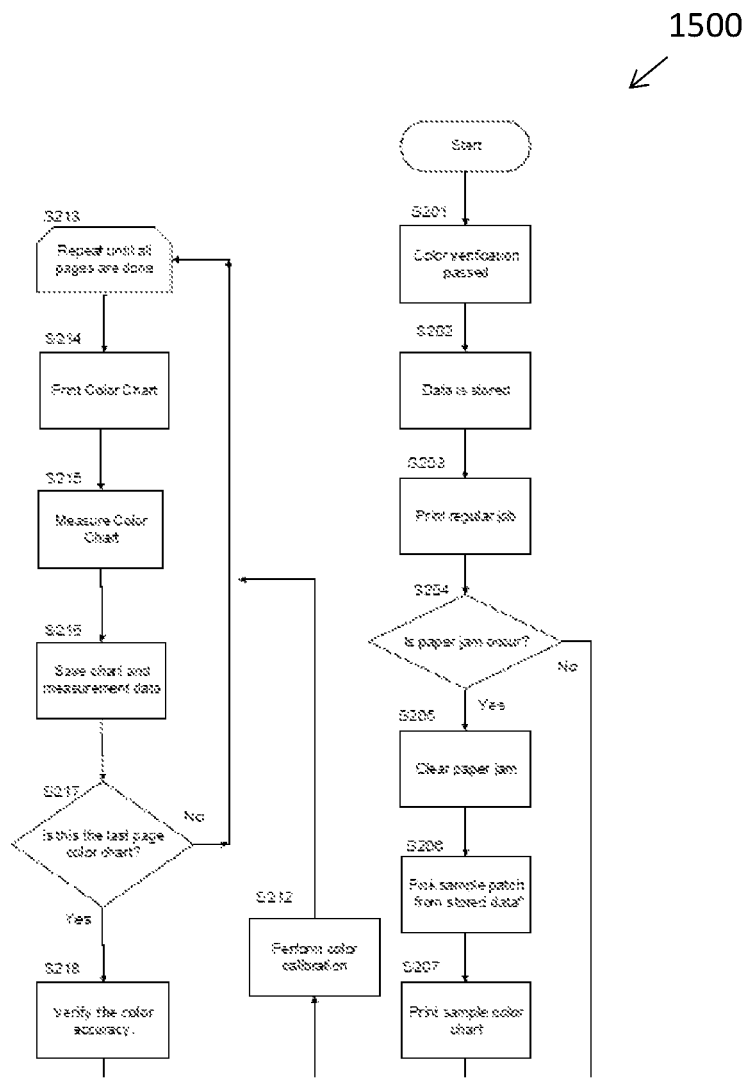
FIGS. 15A and 15B are flow charts illustrating a method and system for reusing color measurement data in accordance with another exemplary embodiment.
Figure 15B:
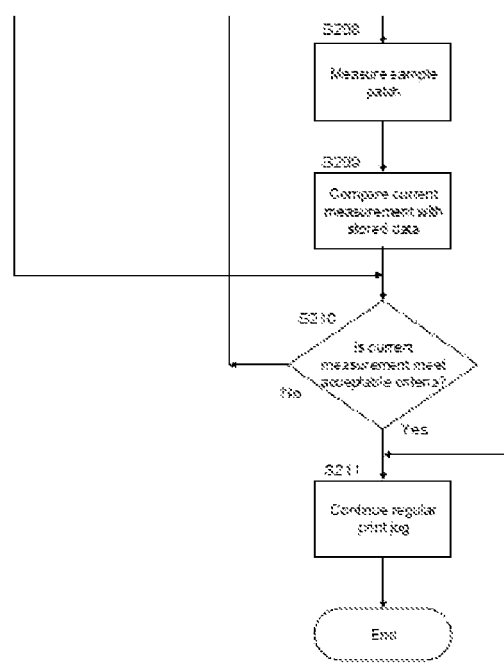

FIGS. 15A and 15B are flow charts 1500, 1510 illustrating a method and system for reusing color measurement data in accordance with another exemplary embodiment. In step S201, if the condition of the print engine has successfully passed the color verification process as set forth in FIG. 14, in step S202, the color verification data is stored (or saved), for example, in the memory of the printer (or MFP) 40, or alternatively, in the memory of the server 20. In step S203, the printer (or MFP) 40 prints a color print job, which can be received from, for example, a client computer 30 within the print shop 10, or a client computer outside of print shop 12, and wherein the printer (of MFP) is hosted or located within a print shop. In accordance with an exemplary embodiment, the print shop 12 can be an office, a business or home having one or more printers (or MFP) 40.

In accordance with an exemplary embodiment, in step S204, a determination can be made, for example, if an interruption in the printing process has occurred, for example, a paper jam. If no interruption has occurred in the printing process, the process continues to step S211 (FIG. 15B), the regular print job continues.

In accordance with an exemplary embodiment, if in step S204, an interruption during the printing process has occurred, the process continues to step S205, where the cause of the interruption is fixed or remedied, for example, the paper jam is cleared. In step S206, one or more sample patches, for example, patches 1013, 1015, 1017, 1019, can be selected from the saved measurement data and corresponding identifier for each of the selected color charts from, for example, step S104 (FIG. 14). In step S207, a sample color chart 1020, 1120, 1220, 1230, is printed. In step S208, the printed sample color chart (or page) 1020, 1120, 1220, 1230 from step S207 is scanned on the printer (or MFP) 40 with a colorimeter (or spectrophotometer) 411, such as an RGB scanner, a spectral scanner with a photo detector or other such sensing device known in the art, which can be embedded in the printed paper path and/or an optional finishing apparatus, which measures the printed color chart.

In accordance with an exemplary embodiment, in step S209, the measured data from step S208 is compared to the saved measurement data and corresponding identifier for the printed color chart 1010, 1110, 1210 from step S104. In step S210, a determination is made if the current measured data from the sample color chart 1020, 1120, 1220, 1230 meets a predetermined or acceptable criteria, for example, is the measured data in step S208 within a given tolerance (or %), for example, as shown in FIG. 13.

In accordance with an exemplary embodiment, if the current measured data from the sample chart 1020, 1120, 1220, 1230 meet the predetermined or acceptable criteria, for example, is the measured data in step S210 within a given tolerance (or %), for example, as shown in chart 1320 of FIG. 13, the process continues to step S211.

In accordance with an exemplary embodiment, if the current measured data from the sample chart 1020, 1120, 1220, 1230 does not meet the predetermined or acceptable criteria, for example, the measured data in step S210 is not within a given tolerance (or %), for example, as shown in chart 1330 of FIG. 13, the process continues to step S212, where a color calibration process is performed, and continues to step S213, where the color verification process begins with the printing of a first page of the multiple color charts or the plurality of color charts.

In step S214, the printer (or MFP) 40 prints a color chart (for example, a printed color page) of the plurality of color charts 600, 1010, 1110, 1210. In step S215, the printed color chart (or page) from step S103 is scanned on the printer (or MFP) 40 with a colorimeter (or spectrophotometer) 411, such as an RGB scanner, a spectral scanner with a photo detector or other such sensing device known in the art, which can be embedded in the printed paper path and/or an optional finishing apparatus, which measures the printed color chart. In step S216, the measurement data and corresponding identifier for the printed color chart 1010, 1110, 1210 is saved, for example, in the memory of the printer (or MFP) 40, or alternatively, in the memory of the server 20. In step S217, a determination is made if the last page of the plurality of color charts 600, 1010, 1110, 1210 has not been printed, the process returns to step S213.

In accordance with an exemplary embodiment, if the last page has been printed, the process continues to step S218 to verify the color accuracy of the printed color charts and proceeds to step S210 where a determination can be made if the current measurements meet acceptable criteria as disclosed herein. As set forth above, in step S210, if the current measured data from the sample chart 1020, 1120, 1220, 1230 meet the predetermined or acceptable criteria, for example, is the measured data in step S210 within a given tolerance (or %), for example, as shown in chart 1320 of FIG. 13, the process continues to step S211. If the current measured data from the sample chart 1020, 1120, 1220, 1230 does not meet the predetermined or acceptable criteria, for example, the measured data in step S210 is not within a given tolerance (or %), the process continues to step S212, where a color calibration process is performed, and continues to step S213, where the color verification process begins with the printing of a first page of the multiple color charts or the plurality of color charts.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image forming apparatus, comprising:
   a sensing device configured to read a color chart, the color chart having one or more color patches; and
   a processor configured to:
      perform a first color verification job;
      perform a second color verification job after the first color verification job when the first color verification job is interrupted before a completion of the first color verification job or when a print job is interrupted, the second color verification job including one or more color patches from a previous color verification job;
      acquire measurement data from the previous color verification job;
      acquire measurement data from the second color verification job; and
      determine whether to re-use the measurement data of the previous color verification job based on one or more differences between the measurement data of the previous color verification job and the measurement data of the second color verification job.

2. The image forming apparatus according to claim 1, further comprising:
   a memory configured to store the measurement data of the previous color verification job.

3. The image forming apparatus according to claim 1, wherein the previous color verification job is the first color verification job.

4. The image forming apparatus according to claim 1, wherein the measurement data of the previous color verification job is a color verification completion data, which was implemented in a same day with the second verification job.

5. The image forming apparatus according to claim 1, wherein the processor is configured to judge whether the previous color verification job is interrupted by a paper jam.

6. The image forming apparatus according to claim 1, wherein the processor is configured to determine to re-use the measurement data of the previous color verification job when a color difference between the measurement data of the previous color verification job and the measurement data of the second color verification job does not exceed a pre-determined value.

7. The image forming apparatus according to claim 3, wherein the processor is configured to print an entirety of the first color verification job only once when the measurement data of the second color verification job does not exceed the pre-determined value.

8. The image forming apparatus according to claim 1, wherein the processor is configured to generate a sample color chart by selecting color patches from the previous color verification job in order to compare the measurement data of the second color verification job to the measurement data of the previous color verification job.

9. The image forming apparatus according to claim 8, wherein the sample color chart includes at least one patch selected from each page of the first verification job.

10. The image forming apparatus according to claim 8, wherein the sample color chart includes a plurality of rows of color patches selected from each page of the first verification job.

11. A method for color verification of an image forming apparatus, the method comprising:
    acquiring measurement data of a previous color verification job;
    judging whether a first color verification job or a print job is interrupted;
    acquiring measurement data of a second color verification job when the first color verification job or the print job is interrupted; and
    determining whether to re-use the measurement data of the previous color verification job based on one or more differences between the measurement data of the previous color verification job and the measurement data of the second color verification job.

12. The method according to claim 11, further comprising:
    storing the measurement data of the previous color verification job after the first verification job is completed in a memory.

13. The method according to claim 11, further comprising:
    judging whether the first color verification job is interrupted by a paper jam.

14. The method according to claim 11, further comprising:
    determining to re-use the measurement data of the previous color verification job when a color difference between the measurement data of the previous color verification job and a measurement data of the second color verification job does not exceed a pre-determined value.

15. The method according to claim 11, further comprising:
    generating a sample color chart by selecting color patches from the previous color verification job in order to compare the measurement data of the second color verification job to the measurement data of the previous color verification job.

16. A non-transitory computer readable recording medium stored with a computer readable program code for color verification of an image forming apparatus, the computer readable program code configured to execute a process comprising:
    acquiring measurement data of a previous color verification job;
    judging whether a first color verification job or a print job is interrupted;
    acquiring measurement data of a second color verification job when the first color verification job or the print job is interrupted; and
    determining whether to re-use the measurement data of the previous color verification job based on one or more differences between the measurement data of the previous color verification job and the measurement data of the second color verification job.

17. The computer readable recording medium according to claim 16, further comprising:
    storing the measurement data of the previous color verification job after the first verification job is completed in a memory.

18. The computer readable recording medium according to claim 16, further comprising:
  judging whether the previous color verification job is interrupted by a paper jam.

19. The computer readable recording medium according to claim 16, further comprising:
  determining to re-use the measurement data of the previous color verification job when a color difference between the measurement data of the previous color verification job and a measurement data of the second color verification job does not exceed a pre-determined value.

20. The computer readable recording medium according to claim 16, further comprising:
  generating a sample color chart by selecting color patches from the previous color verification job in order to compare the measurement data of the second color verification job to the measurement data of the previous color verification job.

* * * * *